United States Patent
Brenner

[15] 3,665,749
[45] May 30, 1972

[54] SHOCK MACHINE

[72] Inventor: Morris Brenner, Washington, D.C.

[73] Assignee: The United States of America as represented by the Secretary of the Army

[22] Filed: July 27, 1970

[21] Appl. No.: 58,440

[52] U.S. Cl. ............................................. 73/12
[51] Int. Cl. ........................................... G01n 3/08
[58] Field of Search ................. 73/1 DC, 12; 188/267

[56] References Cited

UNITED STATES PATENTS

| | | | |
|---|---|---|---|
| 3,142,978 | 8/1964 | Klass | 73/12 |
| 2,788,654 | 4/1957 | Wiancko et al. | 73/1 DC |
| 3,067,620 | 12/1962 | Holloway et al. | 73/1 DC |
| 3,372,572 | 3/1968 | Campbell et al. | 73/1 DC |
| 2,667,237 | 1/1954 | Rabinow | 73/134 UX |
| 2,685,947 | 8/1954 | Votrian | 188/261 X |
| 2,744,409 | 5/1956 | Wintle, Jr. et al. | 73/134 |

*Primary Examiner*—Charles A. Ruehl
*Attorney*—Harry M. Saragovitz, Edward J. Kelly, Herbert Berl and Saul Elbaum

[57] ABSTRACT

A shock machine using a variable viscosity medium. A magnetic fluid shock tester enables the application of programmed shock pulses without the use of an impact medium. A fluid, whose viscosity can be readily varied in a predetermined manner, is provided with a driving force to set the fluid into motion and this motion in turn is imparted to a test platform which contains the test object. Any sudden change in the viscosity of the fluid is transferred directly to the test item, thereby imparting the desired shock signature to the item. The effect of the shock on the item is then measured electronically or visually as desired.

6 Claims, 1 Drawing Figure

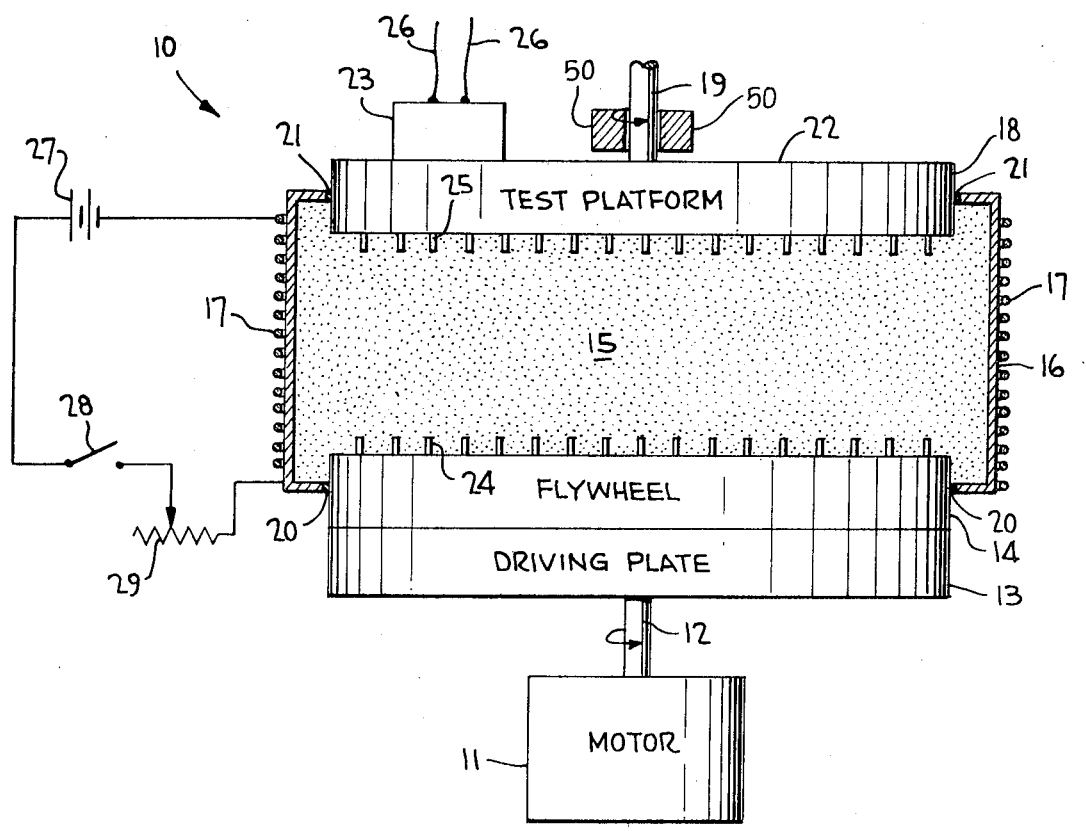

SHOCK MACHINE

RIGHTS OF THE GOVERNMENT

The invention described herein may be manufactured, used, and licensed by or for the United States Government for governmental purposes without the payment to me of any royalty thereon.

BACKGROUND OF THE INVENTION

This invention relates generally to shock testing machines, and more particularly to a magnetic fluid shock tester capable of providing a programmed centrifugal shock to a test item.

Prior art machines for imparting a controlled shock to an item under test have generally been of two types: the first in which the item to be tested is at rest and receives a blow with some type of hammer device, and the second in which the item to be tested is moving and receives a shock as a result of sudden impact with a fixed target such as steel, sand, wood, concrete, rubber etc. Items which are intended for use in rapidly moving projectiles require both an angular and linear acceleration and impact test. Even with such testing the convention has been to employ the above mentioned fixed targets for imparting physical shock to the device being tested. Other well known shock machines which are based on the principle of absorption of the kinetic energy of the moving test item take on various different forms including that of a test tower, pendulum, and an air gun.

The major disadvantages of the above mentioned shock machines reside in the difficulties in correlation of performance characteristics of different machines; the specification, design and evaluation of impact media; the stability of the impact surface (i.e., repeatability of its response); and a realistic simulation of the shock environment for a particular application. The major difficulty, however, resides in providing a practical means of producing a predetermined shock pulse and of duplicating such a shock pulse at will within experimental error. That is, it must be possible to accurately and scientifically define and measure the shock pulse in terms of acceleration and time.

It is, therefore, a primary object of this invention to provide a programmed predetermined shock to a test object.

It is another object of this invention to provide a shock machine capable of repeatably and reliably applying a predetermined shock pulse to a test object.

Still another object of the invention is to provide both an angular and linear shock pulse of predetermined magnitude and duration.

Yet another object is to provide shock testing which does not require the use of an impact medium.

SUMMARY OF THE INVENTION

Briefly in accordance with this invention, a magnetic fluid shock tester enables the application of predetermined shock pulses without the use of an impact medium. A fluid, whose viscosity can be readily varied in a predetermined manner, is provided with a driving force to set the fluid into motion and this motion in turn is imparted to a test platform which contains the test object. Any sudden change in the viscosity of the fluid is transferred directly to the test item, thereby imparting the desired shock signature to the item. The effect of the shock on the item is then measured electronically or visually as desired.

In its most convenient form, the invention comprises a magnetic fluid whose viscosity is varied in response to the application of electricity within a coil in the vicinity of the magnetic fluid. The magnetic fluid is caused to rotate by means of a flywheel connected to a motor through a conventional driving plate, and this rotation through the fluid is imparted to the test platform containing the test item. The application of a predetermined electric signal through the coil causes sudden solidification of the magnetic fluid in a predetermined manner, which in turn imparts a sudden predetermined deceleration of the test platform.

BRIEF DESCRIPTION OF THE DRAWING

The specific nature of the invention as well as other objects, aspects, uses and advantages thereof will clearly appear from the following description and from the accompanying drawing in which:

The FIGURE is a partial cross-sectional view of one embodiment in accordance with the invention.

DESCRIPTION OF THE PREFERRED EMBODIMENT

Referring now to the FIGURE, magnetic fluid 15 is shown to be contained within an enclosure 16 provided with suitable supports (not shown). Coils 17 surround container 16 and are capable of carrying an electric current. Flywheel 14 imparts rotational motion to magnetic fluid 15 by means of a plurality of small nail-like projections 24. These projections may take any suitable form such as ridges within the flywheel or paddle-like projections. The flywheel 14 is driven by motor 11 which is coupled to a drive shaft 12 and a driving plate 13. When the required speed is reached, driving plate 13 is decoupled from flywheel 14 by means of a conventional clutch.

Test platform 22 is located opposite flywheel 14 and is also provided with a plurality of projections 25 similar to projections 24 on the flywheel. Rotation of the flywheel causes rotation of magnetic fluid 15 which in turn imparts rotation to test platform 22. The test platform is free-wheeling and supported at shaft 19. A housing 23 is provided on test platform 22 for containing the test object, and external monitoring of results may be achieved by means of output leads 26 or by use of conventional commutators located on shaft 19. Additionally, the test object may be removed from housing 23 after termination of the test and results visually inspected. Fluid 15 remains confined within housing 16 by means of fluid seals 20 and 21 located at the top and bottom ends of the fluid housing.

The effective viscosity of fluid 15 is varied at will by varying the intensity of the magnetic field through the fluid, which in turn is varied by the application of electric signals through energizing coils 17. Coils 17 are energized by means of a power source 27 in conjunction with a switch 28 and a rheostat 29 to vary the intensity of the signal. More sophisticated signal generators may of course be utilized to provide any signal shape desired.

It is the ability to instantaneously vary the viscosity of fluid 15 in a predetermined manner which makes possible a shock machine capable of providing of conventional shock signatures such as half sine, saw-tooth, square wave etc., as well as special shock signatures such as the acceleration characteristics experienced by projectiles corresponding to mortar shells and the like. Fluid 15 may take on a variety of forms, one common form being a magnetizable liquid which comprises a mixture of small particles of paramagnetic or ferromagnetic material mixed with a liquid or a coolant and antioxidant gas, or even a semi-solid such as a grease. A preferred mixture for use in this invention comprises approximately 90 percent iron powder and 10 percent light machine oil by weight, although any iron or other magnetic powder will exhibit the desired effect. The tendency of the iron particles to settle may be reduced or eliminated by using a liquid of high specific gravity or by using a fluid of low surface tension or by adding to oil a wetting agent to reduce its surface tension. Where lower viscosities are found necessary it may be desirable to reduce the proportion of iron within the mixture. Such reduction in the proportion of iron results in smaller holding forces. These variations in the mixture of fluid 15 are all well within the skill of the ordinary worker in the art.

In operation, flywheel 14 is brought up to its desired speed by means of motor 11 through shaft 12 and driving plate 13. The rotation of flywheel 14 is imparted to test platform 22 through fluid 15 with the aid of nail-like projections 24 and 25. Drive plate 13 is then decouple from flywheel 14 by means of a conventional clutch, and the remaining portions, that is, flywheel 14, fluid 15, and test platform 22 remain in rotation. Switch 28 is then closed to create a surge of current through coils 17 which causes the change in viscosity of fluid 15 in accordance with a predetermined calibration. This sudden change in viscosity of fluid 15 is transferred to platform 22 causing a sudden shock of a predetermined signature to be applied to the test object contained within housing 23. As previously indicated, any predetermined signal may be generated within coils 17 to alter the fluid viscosity in any predetermined manner.

In an alternative embodiment, a more severe shock can be imparted to the test item in housing 23 by rigidly holding platform 22 in place by means of a suitable brake 50 while simultaneously bringing flywheel 14 and fluid 15 up to full speed. With both the flywheel and the fluid rotating at full speed, switch 28 is closed to quickly solidify magnetic fluid 15 and thereby transfer nearly all the rotational energy of the flywheel to the test platform.

It will be appreciated that the above examples are merely illustrative and many variations may be made within the spirit and scope of the invention. Accordingly, I wish it to be understood that I do not desire to be limited to the exact details of construction shown and described, for obvious modifications will occur to persons skilled in the art.

I claim as my invention:

1. A magnetic fluid shock tester comprising a fluid contained within a container, means for applying a driving force to said fluid, means capable of being driven by said fluid, means for securing a test object to said last-named means, means for varying the viscosity of said fluid in a predetermined manner, means for measuring the effect on said test object of a change in viscosity, and wherein said means for applying a driving force to said fluid comprises a motor, a driving plate connected to said motor by means of a shaft, and a flywheel in physical contact with said fluid and coupled to said driving plate.

2. The device of claim 1 further comprising a plurality of projections on the side of said flywheel which is in physical contact with said fluid.

3. The device of claim 1 wherein said means capable of being driven by the fluid comprises a test platform in physical contact with said fluid and in parallel location to said flywheel.

4. The device of claim 3 further comprising a plurality of projections on the side of said test platform which is in physical contact with said fluid.

5. The device of claim 3 wherein said fluid provides inertial interference with the motion of said test platform.

6. The device of claim 5 wherein said test platform is held rigidly in place by means of a brake.

* * * * *